United States Patent [19]
Venkataswamy et al.

[11] Patent Number: 6,020,431
[45] Date of Patent: Feb. 1, 2000

[54] DYNAMIC VULCANIZATES OF ENGINEERING THERMOPLASTIC AND ACRYLATE RUBBER BLENDS WITH DISSIMILAR CURE SITES USING A COMMON CURATIVE

[75] Inventors: Krishna Venkataswamy, Akron; Tonson Abraham, Strongsville, both of Ohio

[73] Assignee: Advanced Elastomer Systems, L.P., Akron, Ohio

[21] Appl. No.: 09/109,647

[22] Filed: Jul. 2, 1998

Related U.S. Application Data

[63] Continuation-in-part of application No. 08/686,782, Jul. 26, 1996, Pat. No. 5,783,631, which is a continuation-in-part of application No. 08/686,798, Jul. 26, 1996, Pat. No. 5,777,033, which is a continuation-in-part of application No. 08/686,799, Jul. 26, 1996, Pat. No. 5,777,029.

[51] Int. Cl.$^7$ ...................................................... C08L 67/02
[52] U.S. Cl. .......................... 525/166; 525/172; 525/179; 525/183
[58] Field of Search .................................... 525/166, 172, 525/179, 183

[56] References Cited

U.S. PATENT DOCUMENTS

| | | | |
|---|---|---|---|
| 4,141,863 | 2/1979 | Albert et al. .................................. | 260/3 |
| 4,434,274 | 2/1984 | Jablonski ................................. | 525/349 |
| 4,480,074 | 10/1984 | Wang ....................................... | 525/194 |
| 5,153,269 | 10/1992 | Greenlee et al. ......................... | 525/228 |
| 5,300,573 | 4/1994 | Patel ......................................... | 525/109 |
| 5,369,182 | 11/1994 | Yu et al. .................................. | 525/240 |
| 5,453,465 | 9/1995 | Yu et al. .................................. | 525/179 |
| 5,574,105 | 11/1996 | Venkataswamy ....................... | 525/179 |
| 5,589,544 | 12/1996 | Horrion .................................... | 525/176 |
| 5,591,798 | 1/1997 | Patel ......................................... | 524/514 |
| 5,777,029 | 7/1998 | Horrion et al. ........................... | 525/92 |
| 5,777,033 | 7/1998 | Venkatawsamy et al. ............... | 525/182 |
| 5,783,631 | 7/1998 | Venkataswamy ........................ | 525/92 |
| 5,843,577 | 12/1998 | Ouhadi et al. ....................... | 428/474.4 |
| 5,910,543 | 6/1999 | Patel et al. ............................... | 525/166 |
| 5,942,577 | 8/1999 | Venkataswamy ....................... | 525/148 |

*Primary Examiner*—Margaret G. Moore
*Attorney, Agent, or Firm*—Alfred D. Lobo; William A. Skinner

[57] ABSTRACT

Dynamic vulcanizates of an engineering thermoplastic ("plastic"), e.g. a polyamide or polyester, with acrylate rubbers having dissimilar functional groups are prepared with a metal fatty acid salt in the absence of a conventional curative, provided the rubbers are molecularly intermixed. An acrylate rubber with halogen functionality ("AcrRubHal") is thus crosslinked in a single mixing stage with an acrylate rubber having carboxyl, hydroxyl or epoxy functionality ("AcrRubX") in a "plastic". Quaternary ammonium salts and tertiary amines do not function as curatives, as one might expect. But a metal fatty acid salt, preferably a metal stearate or oleate and concentrates thereof effectively crosslink the rubbers. TPVs produced without conventional curing agents are relatively "soft", but have highly desirable low temperature physical properties and oil resistance.

12 Claims, No Drawings

DYNAMIC VULCANIZATES OF ENGINEERING THERMOPLASTIC AND ACRYLATE RUBBER BLENDS WITH DISSIMILAR CURE SITES USING A COMMON CURATIVE

CROSS-REFERENCE TO RELATED APPLICATIONS

This application is a continuation-in-part of application Ser. No. 08/686,782, filed on Jul. 26, 1996, to issue as U.S. Pat. No. 5,783,631 on Jul. 21, 1998, and Ser. Nos. 08/686,798 and 08/686,799 filed concurrently on Jul. 26, 1996, to issue as U.S. Pat. Nos. 5,777,033 and 5,777,029 respectively on Jul. 7, 1998.

FIELD OF THE INVENTION

Polymer blends having a combination of elastic and thermoplastic properties, referred to as "thermoplastic vulcanizates" or "TPVs" (also referred to in the past as "thermoplastic elastomers" or "TPEs") are made by dynamic vulcanization to provide desired hardness/softness, oil and temperature resistance, oxidation resistance, and processability, inter alia. In TPVs, which are not physical blends, the properties depend on the respective amounts of "hard" and "soft" phases provided by each component, and the properties of each component. To be of commercial value, the hard phase is typically provided by a readily available engineering thermoplastic resin, familiarly referred to as a "plastic" for brevity. Most commonly the plastic is a synthetic resinous material chosen from polyolefins, polyesters and polyamides which provide a continuous phase of the hard phase in which dispersed domains of the "soft" phase of an elastomer are present. TPVs of "plastics" and one or more vulcanizable (hereafter "curable" for brevity) rubbers are tailored to provide blends of controlled hardness, typically ranging from less than 30 Shore A to 70 Shore D. Such blends are exceptionally resistant to oil swelling, and to compression set. These blends are "custom-tailored" to obtain a precise "fit" having particular sought-after properties.

The Problem

It is well known that to provide a "tailored vulcanizate" in a blend of a polar engineering thermoplastic it is desirable to form vulcanizates with a combination of of rubbers each having repeating units with different functionalities in the backbone of its chain. Suc acrylate rubbers with chosen functionalities (some of these are referred to as being "dual functional") have, to date, been cured with conventional curing agents. Such rubbers being polar are preferably blended with a polar plastic. However, when one rubber has only one functional group on each chain and that group contains a halogen atom, and another rubber contains a functional group which does not have a halogen atom, the rubbers fail to be substantially cured and do not form a usable vulcanizate. By "substantial cure" is meant a degree of cure of at least about 80 percent, desirably at least about 90 or 95 percent; preferably rubbers are substantially fully cured, indicating in excess of 97 percent is cured, as determined by the amount of unextractable acrylic rubber from a test sample of the TPV in toluene at 20° C. The rubbers are cured by reaction between the halogen and other functional groups through either covalent or ionic bonds. It was not known how to crosslink a rubber having solely halogen functionality with one which had solely another functionality. When a combination of rubbers was to be cured and none had halogen functionality but functional groups which were reactive, the rubbers could be cured with only a fatty acid salt, e.g. potassium stearate, used to provide its conventional function in such a reaction, namely that of an accelerator. However, as indicated above, when one of the functional groups is a halogen-containing group which has essentially no inherent reactivity with another rubber, or plural rubbers with chosen functional groups, crosslinking with a combination of conventional curing agent and a fatty acid salt accelerator failed to provide a usable TPV. The solution to the problem was to use only the fatty acid salt and leave out the conventional curing agent.

BACKGROUND OF THE INVENTION

Processes for making blends of co-cured and self-curable rubbers, where one of the curable rubbers does not have halogen functionality, are taught in the above-identified copending patent applications. The term "plastic" refers herein to a resin selected from the group consisting of polyamides, polycarbonates, polyesters, polysulfones, polylactones, polyacetals, acrylonitrile-butadiene-styrene (ABS), polyphenylene oxide (PPO), polyphenylene sulfide (PPS), styrene-acrylonitrile (SAN), polyimides, styrene-maleic anhydride (SMA) and aromatic polyketones, any of which may be used by itself or in combination with another. Most preferred are polar engineering thermoplastic resins, e.g. polyamides and polyesters.

Ser. No. 08/686,782 teaches that acrylic rubbers having "reactive" functional groups may be self-cured without a curing agent. Such "reactive" functional groups are so characterized because it was found that they will crosslink, albeit slowly, under typical dynamic vulcanization conditions, usually in less than 5 minutes, without either a curing agent or an accelerator. "Dynamic vulcanization conditions" refer to a temperature high enough to maintain the components in a liquid state, mixed with high enough shear energy provided for a period long enough, and at a rate sufficient to produce a sudden increase in torque indicative of crosslinking; the temperature ranges from 180° C. to 260° C., preferably 220° C.–240° C., and the shear energy is in the range from about 0.01 to 1 Kw-hr/lb, which covers both batch mixers and continuous extruders. Details of conventional dynamic vulcanization are set forth in U.S. Pat. No. 4,141,863 to Coran and Patel, the disclosure of which relating to dynamic vulcanization is incorporated by reference thereto as if fully set forth herein. Such rubbers were therefore stated to be "self-cured" under dynamic vulcanization conditions. A rubber having a vinyl chloroacetate group was used as a control; it was cured (alone, and not as a co-reactant with another functionalized rubber) with a quaternary ammonium salt, to illustrate properties of a typical, desirable TPV. Table I presents an illustrative example in which the control is an acrylic copolymer having halogen functionality (AR-71) cured with a quaternary ammonium salt (example 1); one of the repeating units of the copolymer has a functional group with a halogen substituent. Another such functional group is benzylic chloride. Such rubbers are hereinafter referred to as having "halogen functionality" or "AcrRubHal", for brevity. By "halogen functionality" is meant a reactive cure site containing a halogen selected from the group consisting of fluorine, chlorine, bromine and iodine, most preferably chlorine. Other illustrative examples in Table I of the '782 application present formation of TPVs from rubbers with epoxy and carboxyl groups without the necessity of a curing agent, using a metal stearate as an accelerator. Examples 2–7 teach combinations of acrylates with epoxy (AR-31 or AR-53) and carboxyl (Vamac-GMB) groups cured with magnesium oxide. Table III illustrates the formation of a vulcanizate of two rubbers, one having a carboxyl group (Vamac-GMB which contains a 0.09 phr antioxidant package) and the other rubber having a hydroxy group (Hytemp 4404 available from BFGoodrich Company) (see examples 8–10 and 12–15). Example 11 illustrates a TPV formed from rubbers having reactive epoxy and hydroxy groups. All examples 8–15 are self-cured with either potassium or magnesium stearate. Table V illustrates the formation of vulcanizates from other rubbers having the above-identified functional epoxy, carboxyl and hydroxy groups, and each is self-cured with potassium stearate. When one group is one of the foregoing groups and the other group has halogen functionality, the rubbers do not self-cure.

The '798 and '799 applications teach TPVs formed by a process in which a first curable acrylic rubber and a curable terpolymer are vulcanized in a polyamide and a polyester respectively, in the presence of a curing agent, to form a blend which has a single low temperature brittle (LTB) point which is intermediate the LTBs of the constituent rubbers.

In the '798 application, an ethylene-alkyl acrylate-carboxylic acid terpolymer rubber is co-cured in a polyamide with another functionalized acrylic rubber using a curing agent, and also in the presence of an accelerator such as a metal stearate. Table I presents illustrative control examples #s 1 and 3 with Nipol AR90-130A having a carboxyl group obtained from Nippon Zeon, which are cured with an amine-terminated polyether. Combinations of the Nipol with the terpolymer rubber are similarly cured. Other illustrative examples #s 5–7 in Table I present formation of TPVs from the rubbers using no curing agent, indicating the reactivity of the epoxy and carboxyl groups is sufficient to permit crosslinking without a curing agent. In Table II, TPVs of the terpolymer and a rubber with hydroxy functionality (Hytemp 4050 from BFGoodrich) are all cured with hexamethylene diamine carbamate.

In the '799 application, an ethylene-alkyl acrylate-carboxylic acid terpolymer is co-cured with another functionalized acrylic rubber with a curing agent, and also in the presence of an accelerator such as a metal stearate. As before, a rubber having a vinyl chloroacetate group was used as a control, cured with a quaternary ammonium salt (but not as a co-reactant with another functionalized rubber), to illustrate a typical desirable TPV. Table I presents an illustrative example in which the control is AcrRubHal (AR71) cured with a quaternary ammonium salt (example 1). Other illustrative examples in Table I present formation of TPVs from different rubbers with carboxyl groups (similar functionality) using magnesium oxide as a curing agent, and a metal stearate as an accelerator. Examples 2–8 and 11–16 teach combinations of different acrylates (Vamac-G and R-40-130A from Nippon Zeon) with similar carboxyl groups cured with magnesium oxide and other curing agents, most using a metal stearate as accelerator. Illustrative examples 17, 19 and 22 present a TPV formed from reactive carboxyl and epoxy functional groups; and #23 presents a TPV formed from reactive carboxyl and hydroxy functional groups, using only potassium stearate as accelerator. There is no teaching that a AcrRubHal can be co-cured with any one or more of the others with the curing agents taught.

In numerous applications, a AcrRubHal provides particularly desirable properties when it is cured with another curable acrylate rubber having carboxyl, hydroxy, or epoxy functionality (singly or together referred to as "AcrRubX"). To date, tailored TPVs of "plastics" having a combination of (AcrRubHal+AcrRubX) dispersed therein are vulcanized sequentially with a curing agent, typically a quaternary ammonium salt. The vulcanization is generally accelerated with a metal fatty acid salt, typically a metal stearate or oleate. For example, when Horrion in U.S. Pat. No. 5,589,544 used a combination of rubbers, one of which had halogen functionality, he cured first one group, then the other in a two-stage process. He therefore never co-cured and crosslinked the halogen-containing group with another non-halogen-containing group (e.g. carboxyl).

The curable rubbers in a TPV are compatible with each other and also with the engineering plastic. By "compatible" is meant that the rubbers form a mixture in which a second phase can co-exist with the continuous phase without the use of a compatibilizer or a surface active agent. Typical acrylic rubbers have a repeating unit with a $C_1$–$C_{10}$ alkyl group in combination with a repeating unit having a group chosen from carboxyl, hydroxyl, epoxy, halogen, ester and the like, and may also include a repeating unit of a $C_2$–$C_3$ olefin. Acrylate rubbers which include a repeating unit derived from a monoolefinically unsaturated monomer which does not have a curable functional group (or reactive site), e.g. ethylene-methyl acrylate copolymer, are not "curable rubbers" as the term is used herein. Because a TPV is formed by melt-blending at a temperature in the range from about 200° C. to 250° C. the reactivity of each component of the blend in that temperature range with one or more of the other components, determines the properties of the final blend.

However, to custom-tailor a blend for requires searching for and finding specific combinations of acrylate rubbers which will provide those properties, and to cure them in such a manner that the effect of the curing agent does not detract from those properties.

One option is to provide different functional groups in the chains of a single rubber and inter-cure these groups as is done in Hytemp® rubbers having both carboxyl and halogen functionality. Since a combination of acrylate rubbers, each having at least one different functional group, provides a wider selection of repeating units from which one may strive to tailor a blend with specific sought-after properties, such a combination is a preferred choice. Whichever combination is chosen, because of the elevated processing temperature, to minimize the adverse effects of a curing agent, particularly if there is a tendency to evolve toxic organic byproducts. Optimally, the final blend is produced by curing without any curing agent. This is possible when the functional groups are co-reactive, that is, they react under elevated temperature conditions sua sponte, that is, on their own or "self-cured", as is the case between a rubber with an epoxy group and another rubber, particularly those with carboxyl, hydroxyl or amino functionalities, as taught in the aforementioned copending applications. An optimal solution to the problem would provide the desired cure with a curing agent which has minimal adverse effects attributable to it, with respect to the other components, and particularly without generating toxic byproducts. More particularly, it is desired to cure plural rubbers with different functional groups at least one of which has a halogen substituent, with a single curing agent which does not produce toxic byproducts and does not adversely affect the desirable properties of the finished, cured blend in which the plastic is not cured.

Highly desirable properties are obtained in a cured blend when one of the rubbers has halogen functionality. Curing such a combination typically requires multiple curing agent which tend to produce toxic byproducts, and also tend to introduce undesirable properties contributed by the curing agents. Further, commonly used curatives such as a quaternary ammonium salt or a tertiary amine in combination with a metal stearate, have been found to produce byproducts harmful in excessive quantity, when used to cure plural rubbers one of which has halogen functionality.

Carboxyl and halogen functional groups in a single chain of an acrylate rubber are dynamically vulcanized ("cured" for brevity) with a combination of a quaternary ammonium salt or a tertiary amine and potassium stearate in commercially available Hytemp® rubbers. Surprisingly, the combination of a quaternary ammonium salt and potassium stearate, or, a tertiary amine and potassium stearate has so minimal a curing effect to cure a AcrRubHal with another rubber having carboxyl, hydroxyl or epoxy functionality, that no substantial crosslinking is evident as indicated by the relatively low torque generated (during blending for vulcanization). Potassium stearate, alone, is not recognized as an effective curing agent for a thermoset acrylate rubber or ethylene acrylic rubber.

SUMMARY OF THE INVENTION

It has been discovered that a metal fatty acid $C_8$–$C_{24}$ salt or metal fatty acid salt concentrate (hereinafter "fatty acid salt"), typically a metal stearate or metal stearate concentrate (hereinafter "metal stearate" whether referred to singly or together) functions as a "curative" for acrylate rubbers having functional groups which are essentially unreactive relative to one another, provided that their chains are so intimately mixed that we refer to them as being disposed in occulating relationship with one another; such mixing is continued at elevated temperature above the glass transition temperature (Tg) of the rubbers, but below a temperature at which either of the rubbers will be degraded. If the chains are insufficiently mixed the rubbers are not substantially fully cured providing evidence that the chains did not achieve the desired occulating relationship. The term "curative" is used herein because it is not known whether the fatty acid salt functions as a co-reactant in the manner of a promoter, or as a catalyst, or both. It is observed that it is difficult to ascertain how much, if any, of the curative is present as the metal fatty acid salt in the TPV even when as much as 12 parts of potassium stearate is used.

More specifically, it has been discovered that a TPV of a combination of compatible curable acrylate rubbers, one of which has halogen functionality ("AcrRubHal"), the other having a functional group unreactive with the group having halogen functionality, may be formed by dynamic vulcanization in the presence of a "plastic", in a single step using only a fatty acid salt, preferably a metal stearate, which when homogeneously dispersed within a reaction mass of the rubbers and plastic, unexpectedly functions as a curative, provided the vulcanization is effected after the rubbers are present in a ratio such that, molecules are so intimately mixed as to be in occulating relationship with one and another; that is, the rubbers are molecularly intermixed. The AcrRubHal is combined with another rubber (AcrRubX) which typically has carboxyl, hydroxyl or epoxy functionality. The change in function of a metal fatty acid salt from accelerator to curative is particularly surprising because a combination of a quaternary ammonium salt or tertiary amine and potassium stearate, fails to generate desired crosslinking, indicated by a sudden increase in torque while the components of the reaction mass are being dynamically vulcanized. A torque less than about 800 m.g (meter.grams), typically as low as 400 m.g, in a laboratory Brabender Plasticorder Model No. ?? indicates an insubstantial curing effect which does not adequately cure a AcrRubHal with a AcrRubX. Avoiding the use of a conventional curing agent such as a quaternary ammonium salt or tertiary amine, avoids undesirable reactions with the plastic phase, or preferential curing of one functional group over the other.

It is therefore a specific object of this invention to provide a process for blending acrylate rubbers in a ratio in the range from 10:1 to 1:10, each rubber having chains with a functional group different from that of chains of the other, until chains of the rubbers are molecularly intermixed, and then dynamically vulcanizing them in contact with an effective amount of a fatty acid salt as the only curative, at a temperature in the range from about 200° C. to 250° C., to form a TPV in which at least one of the rubbers has halogen functionality, and the plastic phase is provided by an engineering thermoplastic which is essentially free of degradation at vulcanization temperature. The hardness of the vulcanizate increases with increasing concentration of fatty acid salt in the range from about 4 to 24 phr.

It is a specific object of this invention to provide a molecularly intermixed blend in which an acrylate rubber with halogen functionality is a critical component which is present in a ratio of (AcrRubHal):(AcrRubX) in a range from 5:1 to 1:5, more preferably from 2:1 to 1:2, then curing the blend in the presence of from 1 to 24 phr (parts by weight based on 100 parts by weight or rubbers), preferably 4 phr to 15 phr, of a metal stearate or metal stearate concentrate, in the absence of a conventionally used curative, the metal stearate preferably dispersed in a carrier which may or may not be vulcanized.

More specifically, an essentially single-stage, batch vulcanizate is prepared by reaction of a first AcrRubHal and a second curable rubber intermixed so that chains of one rubber are occularly disposed relative to chains of the other, in the presence of a plastic, with an effective amount of a metal fatty acid salt as the only curative. The ratio of the AcrRubHal (first) and second curable rubbers is in the range from 80:20 to 20:80, blends outside this range generally having physical properties which are not optimal for most commercial applications; and the amount of metal fatty acid salt or concentrate thereof used, is in the range from 2 to 24 phr. The plastic is a minor proportion by weight of the total amount of first and second rubbers used; the desired, final blend is preferably a "soft" blend preferably having a hardness in the range from about 30 Shore A to 30 Shore D.

It is a specific object of this invention to provide a process to produce relatively soft blends of a polyamide, such as Nylon 6 or copolyamide thereof, and acrylate rubbers; and of a polyester such as polybutylene terephthalate (PBT) or copolyester thereof, and acrylate rubbers; which blends have a hardness generally less than 30 Shore D; a resistance to oil swell less than 20, as measured by ASTM Test D-471, preferably less than 10; which have a resistance to compression set of at least 85 after 70 hr at 150° C.; and, are substantially free of a quaternary ammonium salt or a tertiary amine.

DETAILED DESCRIPTION OF PREFERRED EMBODIMENTS

The plural functionalized acrylic rubbers to be co-cured are generally compatible with each other and also with the plastic, particularly if it is a polyamide or polyester. The sole curative is a metal stearate or concentrate wherein the metal is selected from the group consisting of Groups Ia IIa, IIb and IVa of the Periodic Table, most preferably sodium, potassium, zinc and calcium. It is hypothesized that a portion of the curative reacts in the blend forming byproducts which are evolved, and the remainder is dispersed within the blend as both byproducts of reaction and as the stearate itself.

The dynamic vulcanization is most preferably carried out in a batch mixer such as a Brabender, and less preferably in an axially elongated reaction zone of sufficient length to ensure molecular mixing of the rubbers, in a continuous single pass, with concurrent removal of evolved (small molecule) gases from the zone; or, in plural, typically two, separate passes, with concurrent removal of evolved gases in each pass, if the available zone is relatively short. A typical reaction zone has a L/D ratio in the range from about 20 to 80 and produces a novel final blend having controlled hardness in the range from about 30 Shore A to 30 Shore D, preferably 40 Shore A to 90 Shore A, substantially in the absence of a plasticizer, which is typically a processing oil. The L/D ratio and the choice of components of the final blend will generally dictate whether the process for forming the blend should be a batch process, or continuous, whether in a single stage, or, in separate stages.

Typical acrylic rubbers have an $C_1$–$C_{10}$ alkyl group in combination with one or more groups chosen from $C_2$–$C_3$ olefin, carboxyl, hydroxyl, epoxy, halogen, and the like. Rubbers which do not have a reactive site and are not curable include polymers of ethyl acrylate, butyl acrylate, ethyl-hexyl acrylate, and the like; and also copolymers of ethylene and the aforementioned alkyl acrylates. Such rubbers are preferably avoided in the TPV of this invention, unless used as a diluent. The essential rubber contains halogen functionality, the other(s) being chosen from carboxyl, epoxy and hydroxy. When a repeating unit derived from an olefin is chosen, the olefin preferably has from 2 to 6 carbon atoms; a typical curable rubber may include an ethylene, propylene or butylene repeating unit, the molar ratio of such olefin units to acrylate repeating units typically being less than 2, preferably being in the range from 0.5 to 1.5.

Representative curable rubbers having a vinyl chloroacetate group are AR-71 and AR-72LS, available from Zeon Chemical Division of Nippon Zeon, and Europrene® R, L and S from Enichem; a represetative curable rubber having a benzylic chloride group is Hytemp® 4051 also available from Zeon Chemical.

A curable rubber with a hydroxy reactive site is provided by a comonomer of a hydroxyl finctional acrylate having from about 2 to about 20 and desirably from 2 to about 10 carbon atoms. A specific example of a hydroxy functionalized acrylic rubber is Hytemp 4404 from Nippon-Zeon.

A curable rubber with a pendent epoxy reactive site is provided by an unsaturated oxiranes such as oxirane acrylates wherein the oxirane group can contain from about 3 to about 10 carbon atoms and wherein the ester group of the acrylate is an alkyl having from 1 to 10 carbon atoms with a specific example being glycidyl acrylate. Another choice of unsaturated oxirane monomer is an oxirane alkenyl ether wherein the oxirane and alkenyl groups may each have from 3 to about 10 carbon atoms, as typified by allyl glycidyl ether. Examples of epoxy functionalized acrylic rubbers include Acrylate AR-53 and Acrylate AR31 from Nippon-Zeon, and the like.

A curable rubber with a carboxyl reactive site is provided by a $C_2$–$C_{15}$, preferably $C_2$–$C_8$, monoolefinically unsaturated acid. Examples of acid functionalized acrylic rubbers include terpolymers of ethylene-acrylate-carboxylic acids such as Vamac G and Vamac GLS from DuPont, and other acrylates with carboxyl functionality.

Suitable thermoplastic polyamide resins are crystalline or amorphous high molecular weight solid polymers including homopolymers, copolymers and terpolymers having recurring amide units within the polymer chain. Commercially available nylons having a glass transition temperature (Tg) or melting temperature (Tm) above 100° C. may be used but those having a Tm in the range from 160° C. to about 280° C. are preferred, whether typically used in fiber forming or molding operations. Examples of suitable polyamides are polylactams such as nylon 6, polypropiolactam (nylon 3), polyenantholactam (nylon 7), polycapryllactam (nylon 8), polylaurylactam (nylon 12), and the like; homopolymers of amino acids such as polyaminoundecanoic acid (nylon 11); polypyrrolidinone (nylon 4); copolyamides of a dicarboxylic acid and a diamine such as nylon 6,6; polytetramethyleneadipamide (nylon 4,6); polytetramethyleneoxalamide (nylon 4,2); polyhexamethyleneazelamide (nylon 6,9); polyhexamethylenesebacamide (nylon 6,10); polyhexamethyleneisophthalamide (nylon 6,1); polyhexamethylenedodecanoic acid (nylon 6,12) and the like; aromatic and partially aromatic polyamides; copolyamides such as of caprolactam and hexamethyleneadipamide (nylon 6/6,6), or a terpolyamide, e.g., nylon 6/6,6/6,10; block copolymers such as polyether polyamides; or mixtures thereof. Additional examples of suitable polyamides described in the *Encyclopedia of Polymer Science and Technology*, by Kirk & Othmer, Second Edition, Vol. 11, pages 315–476, are incorporated by reference thereto as if fully set forth herein. Preferred polyamides employed in this invention are nylon 6, nylon 11, nylon 12, nylon 6,6, nylon 6,9, nylon 6,10, and nylon 6/6,6. Most preferred are nylon 6, nylon 6,6, nylon 11, nylon 12 and mixtures or copolymers thereof. The polyarnides generally have a number average molecular weight of from about 10,000 to about 50,000, and desirably from about 30,000 to about 40,0000. The amount of polyamide in the blend is generally from about 25 to about 100, desirably from about 30 to about 90, and preferably from about 35 to about 75 parts by weight per 100 parts by weight of total acrylic rubbers.

Suitable thermoplastic polyesters include the various ester polymers such as polyester, copolyester, or polycarbonate, etc., a monofunctional epoxy endcapped derivative thereof, and mixtures thereof. The various polyesters can be either aromatic or aliphatic or combinations thereof and are generally directly or indirectly derived from the reactions of diols such as glycols having a total of from 2 to 6 carbon atoms and desirably from about 2 to about 4 carbon atoms with aliphatic acids having a total of from 2 to 20 carbon atoms and desirably from about 3 to about 15 or aromatic acids having a total of from about 8 to about 15 carbon atoms. Generally, aromatic polyesters are preferred such as polyethyleneterephthalate, polybutyleneterephthalate, polyethyleneisophthalate, polybutylenenaphthalate, and the like, as well as endcapped epoxy derivative thereof, e.g., a monofunctional epoxy polybutyleneterephthalate. Various polycarbonates can also be utilized and the same are esters of carbonic acid. A suitable polycarbonate is that based on bisphenol A, i.e., poly(carbonyldioxy-1,4-phenyleneisopropyl-idene-1,4-phenylene).

The various ester polymers also include block polyesters such as those containing at least one block of a polyester and at least one rubbery block such as a polyether derived from glycols having from 2 to 6 carbon atoms, e.g., polyethylene glycol, or from alkylene oxides having from 2 to 6 carbon atoms. A preferred block polyester is polybutyleneterephthalate-b-polytetramethylene ether glycol which is available as Hytrel® from DuPont. The amount of polyester in the blend is generally from about 25 to about 100, desirably from about 30 to about 90, and preferably from about 35 to about 75 parts by weight per 100 parts by weight of total acrylic rubbers.

Preferably only one plastic from a single generic class is used, e.g. a polyamide or polyester rather than plural plastics, and it is used in a minor proportion relative to the total weight of rubbers in the blend. Preferably the plastic ranges from about 10 to less than 50 parts, more preferably, from about 20 to 40 parts by weight per 100 parts by weight (phr) of the acrylic rubber. A major proportion of plastic in the blend results in a blend having too high a hardness, that is, above 30 Shore D.

The Process

The process for making a vulcanized blend of an engineering thermoplastic resin ("plastic") and at least two, first and second, curable acrylate rubbers, comprises, (i) masticating or melt-mixing a first curable acrylate rubber with a second curable acrylate rubber, each rubber having a reactive functional group which is substantially unreactive with the reactive functional group of the other, to form a curable mixture (ii) adding an engineering thermoplastic to the curable mixture and continuing to mix the plastic to form a substantially homogeneous mixture, (iii) adding an effective amount of a metal fatty acid salt as the sole curative, the amount being sufficient to cause crosslinking between chains of the rubbers, (iv) curing the mixture of rubbers while mixing with the plastic continues at dynamic vulcanizaton conditions; and, (v) recovering a thermoplastic vulcanized blend of the rubbers in the plastic. Typically from 2 phr to 16 phr of fatty acid salt is added, and sufficient shear energy is introduced into the mixture to dispose chains of the functional groups of the rubbers in occulating relationship relative to each other, and dynamic vulcanization conditions are typically maintained for less than 5 min, preferably less than 2 min.

Preferably, a rubber with halogen functionality is mixed with one or more co-curable rubbers and a metal stearate, e.g. potassium stearate, or potassium stearate concentrate. To the mixture is optionally added an inert inorganic or organic filler, a lubricant, a processing aid, a plasticizer and an antioxidant. Evolved gases are removed through an exhaust duct. Examples of inorganic fillers are calcined clay, titanium dioxide, silica and talc; examples of organic fillers are crushed peanut, cashew shells, coconut charcoal, saturated hydrocarbon and fluorocarbon polymers. The components are intimately mixed in a mixing zone such as a rubber mill, Brabender, Banbury or extruder having a barrel of sufficient length, with a high enough input energy, and for a sufficient period of time to produce the TPV in a single stage. In an extruder, a minimum energy input is typically at least 0.25 Kw-hr/lb. The reaction mass is melt-mixed until the torque exerted by the crosslinked mass suddenly increases. The plastic is the continuous phase. A failure to generate the sudden increase in torque indicates that the extent of the desired crosslinking is so low as to yield an unsatisfactory vulcanizate. The crosslinked mass is then molded, preferably directly, by injection molding into a desired shaped article, for example hoses, gaskets, bellows, seals, and the like.

In the following illustrative examples, all references to "parts" are to "parts by weight". Though the illustrative examples demonstrate the ineffectiveness of a conventionally used quaternary amine salt and a tertiary amine to substantially cure a 50/50 mixture of acrylates with halogen and carboxyl functionalities, there is no reason to expect that other conventionally used curing agents would serve as effective curatives under the same processing conditions. Such other curing agents are various isocyanates such as toluene diisocyante, isocyanate terminated polyester prepolymers, various polyols such as pentaerythritol or diols such as bisphenol-A, various polyamines such as methylene dianiline and diphenyl guanidine, various epoxides such as diglycidyl ether of bisphenol A, and various epoxidized vegetable oils such as soybean oil.

EXAMPLES 1–6

Effect of metal stearate in combination with a conventional curing agent

A rubber with a carboxyl group, specifically Vamac G or Vamac GLS, each being a terpolymer of ethylene, methyl acrylate, and monomethyl fumarate in a weight ratio purported to be about 40:55:5 and 30:65:5 respectively, is blended with an equal portion by weight of Acrylate AR-71 having a vinyl chloroacetate group (Acrylate AR-71 is a copolymer of ethyl acrylate and a lower alkyl, $C_1$–$C_4$, vinyl chloroacetate in a weight ratio of about 95:5). The mixture is masticated in a Type EPL-V 5502 Brabender Plasticorder at room temperature under high shear exerted by the rollers, the plastic added, then the metal fatty acid salt, and dynamically vulcanized. Alternatively, the mixture may be melt mixed at 40° C. to 50° C. prior to being dynamically vulcanized; or, the mixture may be melt mixed while being dynamically vulcanized.

In examples 1 and 2, 100 parts of a masterbatch formed with equal parts by weight of two rubbers, one with carboxyl and the other with halogen functionality, is dynamically vulcanized in the presence of a polyamide, potassium stearate powder and a quaternary ammonium salt. Specifically, in first and second masterbatches (MasBatch1 and MasBatch2) 50 parts of Vamac G and Vamac GLS respectively, and 50 parts of Acrylate AR-71 are blended with 33.3 parts Nylon 6 Ultramid B3 and Hytemp NPC-50 (quaternary ammonium salt).

In examples 3 and 4, 100 parts of each of the foregoing masterbatches is mixed with 33.3 parts Nylon 6 Ultramid B3 and dynamically vulcanized in the presence of another conventional curing agent, namely a tertiary amine (Hytemp SC-75) and no potassium stearate.

In examples 5 and 6, 100 parts of each of the foregoing masterbatches is mixed with 33.3 parts Nylon 6 Ultramid B3 and dynamically vulcanized in the presence of a metal stearate, with only potassium stearate concentrate and no conventional curing agent.

In each of the foregoing examples, the vulcanizate was removed from the Brabender, cold-pressed into a pancake and then compression molded at 500° F. into plaques for physical testing.

TABLE 1

| Materials | 1 | 2 | 3 | 4 | 5 | 6 |
|---|---|---|---|---|---|---|
| UltramidB3 | 33.3 | 33.3 | 33.3 | 33.3 | 33.3 | 33.3 |
| MasBatch1 | 100 | | 100 | | 100 | |
| MasBatch2 | | 100 | | 100 | | 100 |
| Naugard 445 | 2 | 2 | 2 | 2 | 2 | 2 |
| Kem S221 | 2 | 2 | 2 | 2 | 2 | 2 |
| K-St Conc | | | | | 16 | 16 |
| K-St Powd | 2 | 2 | | | | |
| NPC-50 | 3 | 3 | | | | |
| SC-75 | | | 7 | 7 | | |

Notes:
MasBatch1: 50/50 Vamac G and Acrylate AR-71 molecularly intermixed.
MasBatch2: 50/50 Vamac GLS and Acrylate AR-71 molecularly intermixed.
Kem S221 is a waxy lubricant (processing aid) from Witco.
K-St Conc: 50% active potassium stearate in Acrylate Hytemp 4051 CG, an ethyl acrylate rubber with both —Cl and —COOH functionalities in each chain.
K-St Powd: 100% active potassium powder.
NPC-50 refers to Hytemp ® NPC-50: a quaternary ammonium salt.
Sc-75 refers to Hyemp ® SC-75: oxazoline or oxazoline combined with a tertiary amine.

TABLE 2

PHYSICAL PROPERTIES

| Property | 1 | 2 | 3 | 4 | 5 | 6 |
|---|---|---|---|---|---|---|
| UTS, psi | 196 | 308 | 216 | 310 | 832 | 1100 |
| % Elong | 647 | 610 | 780 | 775 | 400 | 210 |
| M 100%, psi | 80 | 120 | 87 | 113 | 293 | 530 |
| % TS | 15 | 14 | 15 | 17 | 17 | 9.5 |
| Torque* (m.g) | | | 790 | 780 | 1160 | 1235 |
| Shore A | 30 | 36 | 30 | 36 | 50 | 65 |

*torque is measured after dynamic vulcanization is complete

From the foregoing physical properties it is evident from examples 1–4, that irrespective of the presence of potassium stearate in combination with either a tertiary amine or a quaternary ammonium salt curing agent, none yields a high enough torque representative of an acceptable vulcanizate; and the hardness in the range from Shore A 30-36 confirms the absence of extensive crosslinking. The properties are representative of only the chlorine-functional rubber having been cured.

EXAMPLES 7–11

Effect of metal stearate alone as curative

In a manner analogous to that in examples 1–6 above, vulcanizates were prepared with the halogen-functional rubber alone, and each of two carboxyl-functional rubbers alone; and with masterbatches of each carboxyl-functional rubber and the halogen-functional rubber, using in each example, only K-St concentrate to cure the blends. Recipes for each blend are provided in Table 3.

TABLE 3

| Materials | 7 | 8 | 9 | 10 | 11 |
|---|---|---|---|---|---|
| Ultramid B | 33.3 | 33.3 | 33.3 | 33.3 | 33.3 |
| Acrylate AR-71 | 100 | | | | |
| Vamac G | | 100 | | | |
| Vamac GLS | | | 100 | | |
| MasBatch1 | | | | 100 | |
| MasBatch2 | | | | | 100 |
| Naugard 445 | 2 | 2 | 2 | 2 | 2 |
| Kem S221 | 2 | 2 | 2 | 2 | 2 |
| Pot St Conc | 16 | 16 | 16 | 16 | 16 |

TABLE 4

PHYSICAL PROPERTIES

| Property | 7 | 8 | 9 | 10 | 11 |
|---|---|---|---|---|---|
| UTS,psi | 1220 | 260 | 310 | 832 | 1100 |
| % Elongation | 230 | 710 | 520 | 400 | 250 |
| M 100%, psi | 620 | 127 | 137 | 290 | 525 |
| % TS | 12 | 35 | 34 | 17 | 15 |
| Torque (m.g) | 1560 | 460 | 420 | 1160 | 1390 |
| Shore A | 64 | 36 | 46 | 50 | 58 |

It is evident from the foregoing data that the Acrylate AR-71 alone is cured with only the K-St, but neither of the Vamac rubbers is adequately cured as evidence by the low UTS, less than 500, and torque less than 1000.

EXAMPLES 12–15

Effect of metal stearate alone as curative in polyamide and polyester vulcanizates In a manner analogous to that in examples 1–6 above, vulcanizates were prepared with each of the masterbatches in nylon and polybutyleneterephthalate (PBT), respectively, using in each example, only K-St concentrate to cure the blends. Recipes for each blend are provided in Table 5.

TABLE 5

| Materials | 12 | 13 | 14 | 15 |
|---|---|---|---|---|
| UltramidB3 | 33.3 | | 33.3 | |
| PBT2002 | | 33.3 | | 333 |
| MasBatch1 | 100 | 100 | | |
| MasBatch2 | | | 100 | 100 |
| Naugard 445 | 2 | 2 | 2 | 2 |
| Kem S221 | 2 | 2 | 2 | 2 |
| Pot. St Conc | 16 | 16 | 16 | 16 |

TABLE 6

PHYSICAL PROPERTIES

| Property | 12 | 13 | 14 | 15 |
|---|---|---|---|---|
| UTS, psi | 832 | 890 | 1100 | 1015 |
| % Elongation | 400 | 210 | 250 | 194 |
| M 100%, psi | 290 | 530 | 527 | 614 |
| % TS | 17 | 9.5 | 15 | 15 |
| Torque (m.g) | 1160 | 1230 | 1390 | 1420 |
| Shore A | 50 | 65 | 58 | 71 |

EXAMPLES 16–19

Effect of concentration of metal stearate

In a manner analogous to that in examples 1–6 above, vulcanizates were prepared with a masterbatch of Vamac GLS (MasBatch2) in nylon using in each example, different concentrations of K-St concentrate to cure the blends. Recipes for each blend are provided in Table 7.

TABLE 7

| Materials | 16 | 17 | 18 | 19 |
|---|---|---|---|---|
| UltramidB3 | 33.3 | 33.3 | 33.3 | 33.3 |
| MasBatch2 | 100 | 100 | 100 | 100 |
| Naugard 445 | 2 | 2 | 2 | 2 |
| Kem S221 | 2 | 2 | 2 | 2 |
| Pot. St Conc | 4 | 8 | 16 | 24 |

TABLE 8

PHYSICAL PROPERTIES

| Property | 16 | 17 | 18 | 19 |
|---|---|---|---|---|
| UTS, psi | 83 | 326 | 984 | 1024 |
| % Elongation | 1560 | 470 | 290 | 310 |
| M 100%, psi | 77 | 171 | 429 | 410 |
| % TS | 50 | 25 | 21 | 25 |
| Torque (m.g) | 300 | 640 | 1300 | 1420 |
| Shore A | 32 | 41 | 57 | 58 |

EXAMPLES 20–22

Effect of type of metal fatty acid salt

In a manner analogous to that in examples 16–19 above, vulcanizates were prepared with a masterbatch of Vamac GLS (MasBatch2) in nylon using in each example, the same concentration of different metal fatty acid salts to cure the blends. Recipes for each blend are provided in Table 9.

TABLE 9

| Materials | 20 | 21 | 22 |
| --- | --- | --- | --- |
| UltramidB3 | 33.3 | 33.3 | 33.3 |
| MasBatch2 | 100 | 100 | 100 |
| Naugard 445 | 2 | 2 | 2 |
| Kem S221 | 2 | 2 | 2 |
| Potassium stearate conc. | 16 | | |
| Zinc stearate conc. | | 16 | |
| Sodium oleate conc. | | | 16 |

TABLE 10

PHYSICAL PROPERTIES

| Property | 20 | 21 | 22 |
| --- | --- | --- | --- |
| UTS, psi | 985 | 266 | 1280 |
| % Elongation | 290 | 690 | 270 |
| M 100%, psi | 429 | 148 | 510 |
| % TS | 21 | 31 | 14 |
| Torque (m.g) | 1300 | 445 | 2644 |
| Shore A | 57 | 39 | 60 |

We claim:

1. A thermoplastic elastomer composition comprising, an engineering thermoplastic phase and a crosslinked rubber phase comprising at least two curable acrylate rubbers, chains of a first rubber having a sole functional group substantially unreactive with a functional group on chains of a second rubber under dynamic vulcanization conditions, said rubbers being crosslinked through said functional groups in the presence of an effective amount of a metal fatty acid salt and in the absence of any other curing agent.

2. The composition of claim 1 wherein said engineering thermoplastic phase is provided by a synthetic resinous material selected from the group consisting of polyesters and polyamides said material being present in an amount in the range from about 25 to about 100 parts by weight per 100 parts by weight of said rubbers.

3. The composition of claim 2 wherein one rubber has repeating units having a sole functional group containing a halogen atom, and another rubber has repeating units containing a functional group selected from the group consisting of hydroxyl, carboxyl and epoxy.

4. The composition of claim 2 wherein said metal in said metal fatty acid salt is selected from the group consisting of Groups Ia IIa, IIb and IVa of the Periodic Table and is present in an amount in the range from 2 phr to 24 phr.

5. The composition of claim 4 wherein said metal in said metal fatty acid salt is selected from the group consisiting of sodium, potassium, zinc and calcium; and said fatty acid is selected from the group consisting of stearic and oleic.

6. The composition of claim 4 having a hardness ranging from about 30 Shore A to 70 Shore D.

7. A process for making a vulcanized blend of an engineering thermoplastic resin and at least two, first and second, curable acrylate rubbers, comprising, (i) masticating a first curable acrylate rubber with a second curable acrylate rubber, each rubber having a reactive functional group which is unreactive with the reactive functional group of the other in the absence of a curative to form a curable mixture;

(ii) adding an engineering thermoplastic to the curable mixture and continuing to mix the thermoplastic to form a substantially homogeneous mixture;

(iii) adding an effective amount of a metal fatty acid salt as the sole curative, the amount being sufficient to cause crosslinking between chains of the rubbers;

(iv) mixing said rubbers until chains of said first rubber are in occulating relationship with chains of said second rubber;

(v) curing the mixture of rubbers while mixing with said engineering thermoplastic at dynamic vulcanizaton conditions; and, (vi) recovering a thermoplastic vulcanized blend of said rubbers in said engineering thermoplastic.

8. The process of claim 7 including masticating a first rubber having chains with a repeating unit having a sole functional group containing a halogen atom, and a second rubber having chains with a repeating unit containing a functional group selected from the group consisting of hydroxyl, carboxyl and epoxy.

9. The process of claim 8 including adding an engineering thermoplastic material selected from the group consisting of polyesters and polyamides, said material being present in an amount in the range from about 25 to about 100 parts by weight per 100 parts by weight of said rubbers.

10. The process of claim 9 including melt-mixing said engineering thermoplastic material with said rubbers and said metal fatty acid prior to dynamic vulcanization of said blend.

11. The process of claim 9 including melt-mixing said engineering thermoplastic material with said rubbers and said metal fatty acid while dynamically vulcanizing said blend.

12. A thermoplastic vulcanized blend of an engineering thermoplastic resin and at least two, first and second, curable acrylate rubbers, said blend prepared by (i) masticating a first curable acrylate rubber with a second curable acrylate rubber, each rubber having a reactive functional group which is unreactive with the reactive functional group of the other in the absence of a curative, to form a curable mixture;

(ii) adding an engineering thermoplastic to the curable mixture and continuing to mix the thermoplastic to form a substantially homogeneous mixture;

(iii) adding an effective amount of a metal fatty acid salt as the sole curative, the amount being sufficient to cause crosslinking between chains of the rubbers;

(iv) mixing said rubbers until chains of said first rubber are in occulating relationship with chains of said second rubber;

(v) curing the mixture of rubbers while mixing with said engineering thermoplastic at dynamic vulcanizaton conditions; and, (vi) recovering a thermoplastic vulcanized blend of said rubbers in said engineering thermoplastic.

* * * * *